(No Model.) 2 Sheets—Sheet 2.

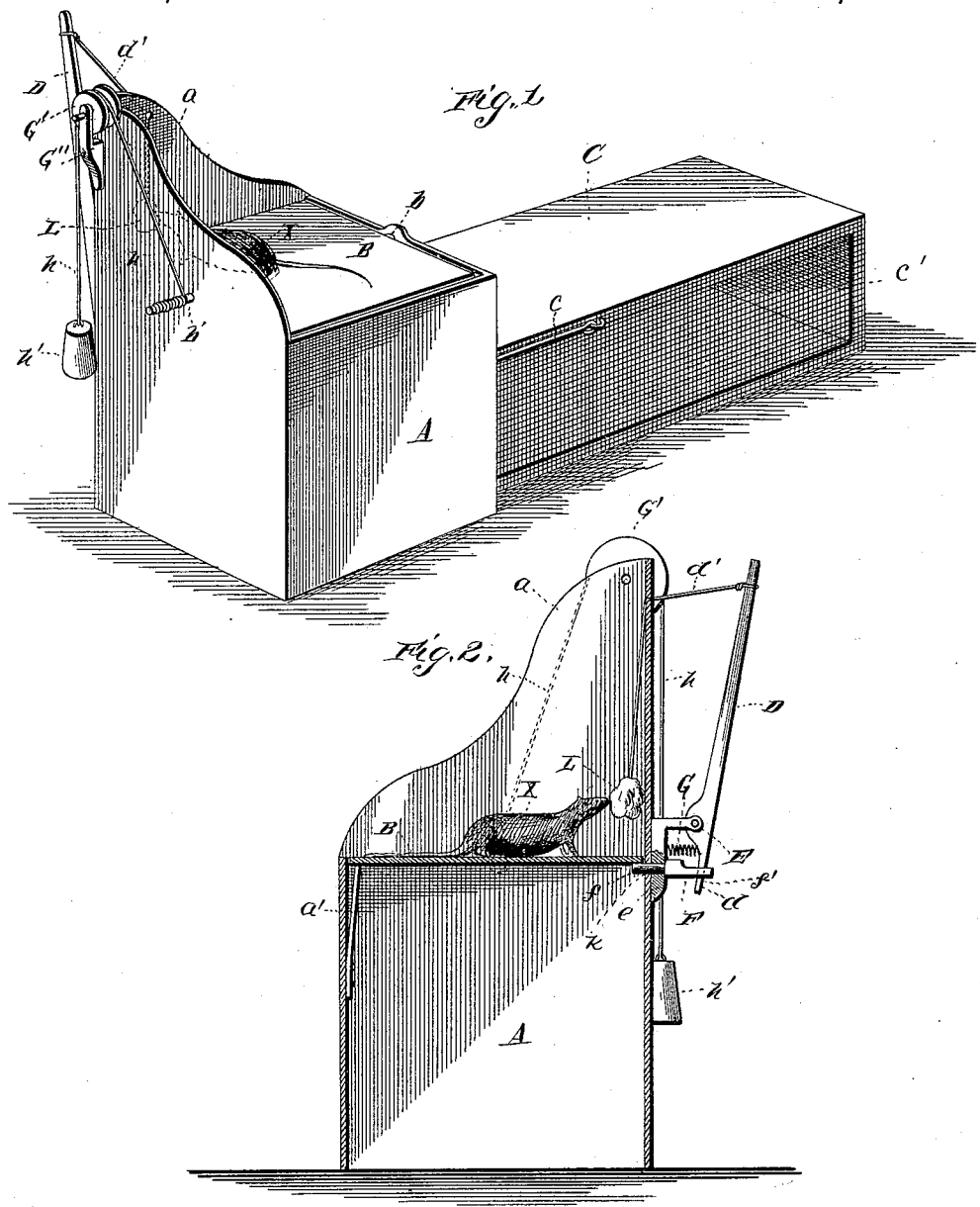

J. W. MURPHY & J. LENNON.
ANIMAL TRAP.

No. 464,479. Patented Dec. 1, 1891.

Witnesses:
C. S. Taylor
R. A. Balderson.

Inventors:
John W. Murphy,
Joseph Lennon,
By their Attorneys,
Rigdon & Rigdon

United States Patent Office.

JOHN W. MURPHY AND JOSEPH LENNON, OF KANSAS CITY, MISSOURI; SAID LENNON ASSIGNOR TO HARTZEL FISHER, OF SAME PLACE.

ANIMAL-TRAP.

SPECIFICATION forming part of Letters Patent No. 464,479, dated December 1, 1891.

Application filed December 14, 1889. Renewed September 15, 1890. Again renewed April 20, 1891. Serial No. 389,693. (No model.)

*To all whom it may concern:*

Be it known that we, JOHN W. MURPHY and JOSEPH LENNON, of Kansas City, Jackson county, Missouri, have invented certain new and useful Improvements in Automatic Animal and Fowl Traps, of which the following is a full, clear, and exact description, reference being had to the accompanying drawings, forming a part hereof.

Our invention relates to improvements in automatic animal and fowl traps designed more especially for small animals; and it consists in the novel construction and arrangement hereinafter set forth and described.

Figure 3:
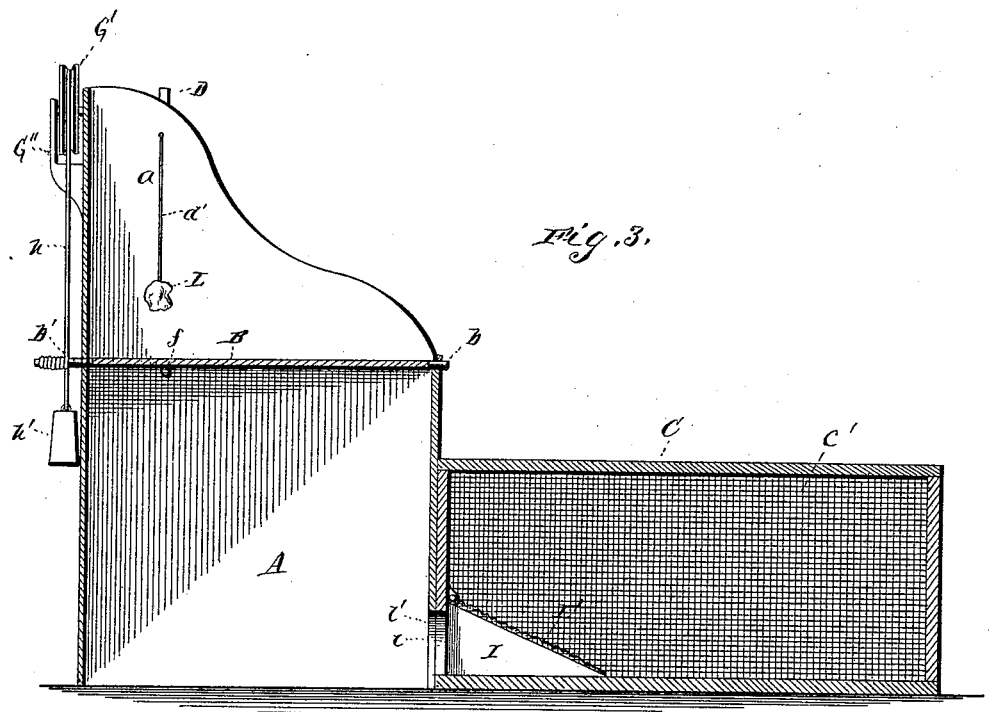
Figure 4:
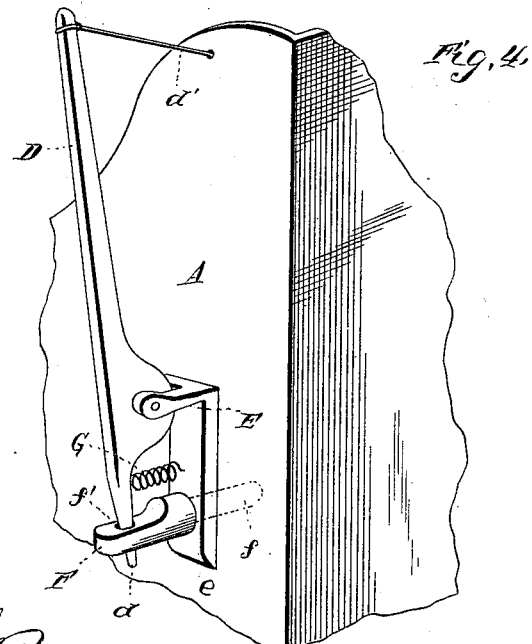

In the drawings, which illustrate the manner of carrying out our invention, Figure 1 is a perspective view of trap in its normal position. Fig. 2 is a cross-sectional view of the pit A, showing the mechanism employed for operating the pivoted shelf which precipitates the animal into said pit. Fig. 3 is a central longitudinal section through the device, and Fig. 4 is a detail in perspective of the mechanism used for operating our device.

Referring to the drawings by letter, A represents a box or pit provided with a top or covering B, which is pivoted at its center on shaft $b$, said shaft $b$ extending through the sides of the pit and is provided with a cord $h$, which coils around the projection $b'$ of shaft $b$, said cord or rope $h$ being provided with a small weight $h'$, which operates over pulley G', this throwing the covering B in position after the animal has been precipitated into the pit. We can also use a spring for operating our device, and when such is the case we remove the weight $h'$.

C is the cage properly secured to pit A, having the sides made of suitable wire netting. Our preferred method of securing said cage C to pit A is by suitable hooks and eyes $c$. (Illustrated in Fig. 1.) D is a lever secured to the side of pit A by means of suitable support E, said lever D being provided at its upper end with a cord $d'$, which passes through the upright sides $a$, said cord D having attached to its lower end a bait L. This bait is hung over to side of the pivoted covering B, and when the rat or other animal commences to gnaw on said bait L cord $d$, operating lever D, draws the pin F out of the side of pit A, thus causing said covering B to tilt very quickly, precipitating the animal in the pit. The pin F is provided with a reduced end $f$, which passes through the side wall $a$ of pit A. This end $f$ forms a bearing for the revolving lid B, and as soon as the rat or other animal is precipitated in the pit A spring G forces the pin F back in position in time to catch the revolving covering B, thus keeping the trap set all the time.

G' is a pulley secured in the boxing G'', over which operate the weight-cords $h$.

I is an opening between pit A and cage C, said opening I being provided with an inclined wire top I', which rises enough to allow the animal to pass from the pit A into the cage C, when it immediately falls back into position, thus cutting off the return passage. By this means the pit is kept clear and the trap is ready to entrap other animals. $i$ and $i'$ are openings between the said pit A and cage C.

$a'$ is a flexible steel spring secured to the wall of pit A. This forms a bearing for pivoted cover B and prevents it from tilting in the wrong direction; but it is made flexible enough to bend backward as said cover B makes its revolution.

This trap can be made large enough to contain all species of animals—such as rats, squirrels, minks, foxes, &c.—and may also be constructed to entrap wild turkeys and other fowls.

Having thus fully described our invention, what we claim as being new, and desire to secure by Letters Patent, is—

An improved animal-trap consisting of the pit A, the revolving lid B, the shaft $b$, upon which said lid revolves, said shaft being extended without the sides of the pit, the cord $h$, wound around said extended portion of the shaft, the pulley G', secured upon one of the extended sides of the pit and adapted to guide the cord $h$, the weight $h'$ upon the end of said cord to revolve the lid, the lever D, pivoted in the bracket E, the spring G, interposed between said bracket and the lever, the pin F, connected with the lower end of said lever and extending through the bracket into the pit to support the lid, and the bait-cord $d'$, secured to the upper end of the lever and passing through an extended side of the pit and resting over the lid, all arranged and adapted to operate substantially as described.

In testimony whereof we affix our signatures in presence of two witnesses.

JOHN W. MURPHY.
      JOSEPH LENNON.

Witnesses:
 A. A. HIGDON,
 R. A. BALDERSON.